United States Patent [19]

Lang

[11] Patent Number: 4,861,194
[45] Date of Patent: Aug. 29, 1989

[54] WASTE DISPOSAL SYSTEM

[76] Inventor: Raymond G. Lang, 19961 36th Ave., Langley, British Columbia, Canada, V3A 2R3

[21] Appl. No.: 191,346

[22] Filed: May 9, 1988

[30] Foreign Application Priority Data

Feb. 2, 1988 [CA] Canada .................................. 557907

[51] Int. Cl.[4] ............................................. B09B 1/00
[52] U.S. Cl. .................................................... 405/128
[58] Field of Search ........................ 405/128, 129, 133; 166/57; 252/633

[56] References Cited

U.S. PATENT DOCUMENTS

| 4,040,480 | 8/1977 | Richards | 405/128 X |
| 4,181,451 | 1/1980 | Boehling et al. | 405/128 |
| 4,316,814 | 2/1982 | Uerpmann | 405/128 |
| 4,428,700 | 1/1984 | Lennemann | 405/128 |
| 4,453,857 | 6/1984 | Serra et al. | 405/128 |

Primary Examiner—David H. Corbin
Attorney, Agent, or Firm—Fulwider, Patton, Rieber, Lee & Utecht

[57] ABSTRACT

A waste disposal appartaus comprising a containment cage for holding conventional waste containers. The containment cage has a base platform with attached support feet. Upwardly extending members define the containment portion of the cage, the members having attached centering guides, and a perimeter member to define the open top of the container. Each containment cage is stacked atop a previous containment cage in a column within a shaft, the support feet of each containment cage engaging the perimeter member of the previous containment cage and the centering guides engaging the walls of the shaft to provide a clear space around the containment cage.

11 Claims, 1 Drawing Sheet

WASTE DISPOSAL SYSTEM

FIELD OF THE INVENTION

This invention relates to a waste disposal apparatus and system for safely disposing of toxic waste.

DESCRIPTION OF THE PRIOR ART

Today's industries create a great deal of dangerous and harmful or toxic waste material including PCB's used in power transformers and radioactive waste from nuclear power plants. Often these materials are loaded into sealed metal cannisters and disposed of using conventional means such as burying in land-fill sites, or dumping the material into the sea at offshore disposal sites. However, it has been clearly established that often such disposal methods are inadequate. After being buried underground or under the sea for many years, many of these hazardous waste materials are escaping from their metal cannisters as the cannisters begin to rust and decay. At landfill sites, the waste materials are getting into the soil and polluting the ground water and presenting a serious health threat to people nearby.

Today, after learning from the pollution disposal problems of the recent past, some of the more dangerous toxic wastes such as radioactive wastes are being disposed of more carefully. In many instances, toxic waste material sites are being established where waste materials housed in metal cannisters are being stacked in sealed shafts drilled into the ground. Several patents have been granted disclosing methods of disposing of hazardous waste in such a manner. For example, U.S. Pat. No. 4,452,478 to Dulaney discloses a nuclear waste storage system for storing specially designed cylinders containing hazardous waste material in deep wells with the containers stacked one upon another. U.S. Pat. No. 4,040,480 to Richards teaches a storage method for radioactive material in vertical wells with a built in heat exchange system to absorb any radiation from the containers. U.S. Pat. No. 4,316,814 to Uerpman discloses a closure for sealing wells housing hazardous material.

SUMMARY OF THE INVENTION

In a first aspect the present invention is a waste disposal apparatus comprising a containment cage for holding conventional waste containers having a base platform with attached support feet, upwardly extending members to define the containment portion of the cage, the members having attached centring guides, and a perimeter member to define the open top of the container whereby each containment cage is stacked atop a previous containment cage in a column within a shaft, the support feet of each containment cage and the centring guides engaging the wall of the shaft to provide a clear space around the containment cage.

In a second aspect, the present invention is a method for disposing of toxic waste material utilizing the waste disposal apparatus comprising the steps of drilling a shaft in the ground; sealing the walls of the shaft; lowering waste disposal apparatus containing toxic waste containers into the shaft to stack atop previously lowered waste disposal apparatus in a column; pouring concrete into the shaft in order to seal the toxic waste container within the waste disposal apparatus, the constructon of the waste disposal apparatus ensuring that the concrete is able to completely surround the toxic waste containers; and sealing the top of the shaft with a plate sandwiched between two concrete plugs.

BRIEF DESCRIPTION OF THE DRAWINGS

The present invention provides an inexpensive and easily manufactured container for handling and storing hazardous materials in underground shafts. As well, use of the present invention ensures that hazardous waste is surrounded by sealing concrete when the shaft is filled.

The present invention is illustrated in the following figures in which.

DESCRIPTION OF THE PREFERRED EMBODIMENTS

Figure 1:
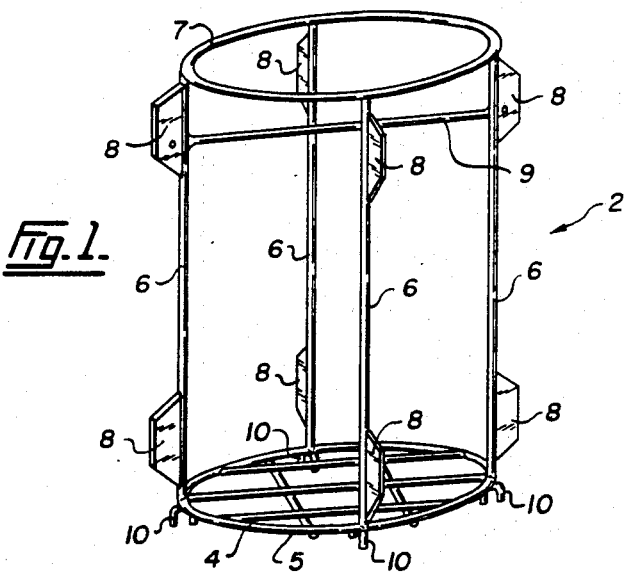
FIG. 1 is a preferred embodiment of the containment cage of the present invention.

Referring to FIG. 1 there is shown a preferred embodiment of the waste disposal apparatus designed to hold a standard metal drum waste barrel. The apparatus is a containment cage 2 formed from a lower circular base platform 4 with four vertical members 6 extending upwardly from the edge of the base platform to define an enclosed area to house a waste container. Base platform 4 is formed from a reinforced grill extending between the edges of a hoop member 5. A second hoop member 7 is attached to the upper ends of the four vertical members 6 to form the upper edge of the containment cage. Each vertical member 6 has two centring guides 8 attached comprising an upper and lower outwardly extending projection from the cylindrical form defined by the vertical members. At the base of each vertical member 6, a support foot 10 comprising an inverted U-shaped Optimally, hold down member 9 may be used in order to secure waste containers within the containment cage. Hold down member 9 comprises a simple bar extending across the diameter of the containment cage and located by bolts through centring guides 8. In a preferred embodiment, the various members of the containment cage are constructed from conventional concrete reinforcing bar (rebar) and welded together. The size and quantity of rebar used to construct a containment cage will vary with the weight of the waste container to be held and the depth to which the containers will be stacked on top of each other. The vertical members 6 may be increased in number to house heavier waste containers. As well, the containment cage does not have to be cylindrical, rather it can be formed into a shape to accept the waste container to be held and corresponding to the shaft into which the containment cage is placed.

Figure 2:
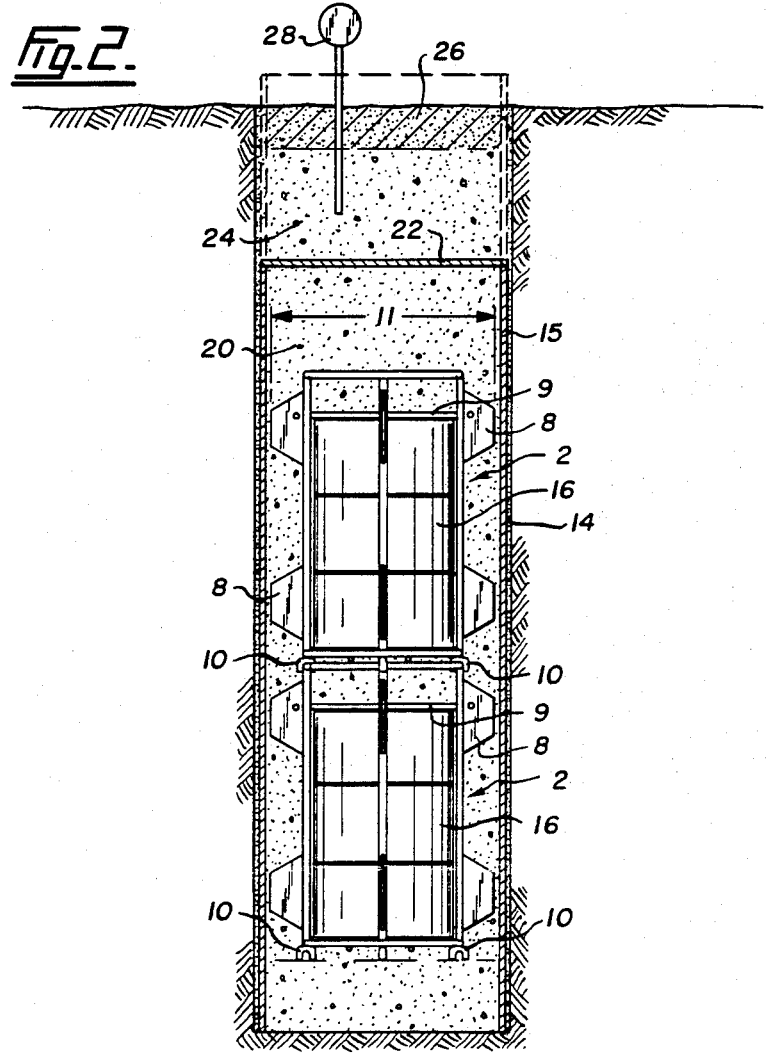
FIG. 2 shows the containment cage in use.

FIG. 2 shows the waste disposal apparatus of FIG. 1 in use. An essentially vertical shaft 14 is drilled into the ground with a diameter slightly larger than the maximum diameter 11 of the containment cage measured to the outer edges of the cage's centring guides 8. Ideally, shaft 14 should be drilled into an impervious formation such as clay, shale or sandstone or a combination thereof. As well, shaft 14 should be a safe distance from any underground aquifers. Once shaft 14 is drilled steel pipe liner 15 is installed having a diameter less than shaft 14. The space between the outer surface of liner 15 and shaft 14 is pressure grouted with concrete in the same manner as is used in the setting of surface pipe for oil wells. This procedure involves directing concrete to the base of shaft 14 under high pressure so that it is forced upwardly in the cavity between the shaft walls and the steel liner. Waste containers 16 are loaded into the containment cages 2, hold down member 9 is attached in place and the cages are then lowered into the shaft 14 using a crane or similar lifting device. The containment cages are dimensioned to extend above the upper surface of the waste cannisters as shown in FIG. 2 so that the cages may be stacked one on top of the other within shaft 14. Support feet 10 are positioned to straddle and engage upper hoop 7 of the previous containment cage. After a certain number of containment cages with their waste containers have been loaded into the shaft, the shaft is filled with concrete to seal in the loaded containers. A conventional vibrating apparatus is used to ensure that the concrete is firmly packed around the cages 2. The centring guides 8 keep the containment cages 2 and their waste containers 16 away from the walls of the shaft 14 and centred within the shaft which allows the freshly poured semi-solid concrete to completely surround the hazardous waste containers.

Concrete may be added to shaft 14 after every few containment cages are positioned to seal in the cages in batches, or the shaft may be filled with containment cages and concrete added only once. The latter procedure is the quickest but assumes that there are sufficient waste containers 16 on hand to fill shaft 14 in one step. When the cages are sealed in batches, the top of the uppermost containment cage is left uncovered so that the support feet 10 of the next cage will be able to rest on the exposed upper hoop 7 of the partially buried cage.

A final sealing procedure is performed once a shaft is filled within approximately 15 feet of the top of the shaft. First, a five foot thick plug of concrete 20 is applied over the uppermost containment cage. Then a steel plate 22 corresponding to the diameter of the liner 15 is welded to the liner. The liner above this steel plate 22 is cut away and removed and a final five foot thick plug of concrete 24 is added. Backfill 26 is then added to the shaft to create a surface level with the surrounding ground. A marker 28 is embedded in the uppermost plug of concrete 24 and extends through the layer of backfill 26 to mark the location of burial shaft 14.

With no void spaces and the rebar of the containment cages to reinforce the concrete, the present method allows the waste containers to the securely sealed with a reinforcement concrete column.

I claim:

1. A waste disposal apparatus comprising:
   a containment cage for holding conventional waste containers having a base platform with attached support feet, upwardly extending members to define the containment portion of the cage, the members having attached centring guides, and a perimeter member to define the open top of the container whereby each containment cage is stacked atop a previous containment cage in a column within a shaft, the support feet of each containment cage engaging the perimeter member of the previous containment cage and the centring guides engaging the walls of the shaft to provide a clear space around the containment cage.

2. A waste disposal apparatus as claimed in claim 1 in which said containment cage is constructed from rebar.

3. A waste disposal apparatus as claimed in claim 1 in which said centring guides comprise outwardly extending projections attached to the upwardly extending members.

4. A waste disposal apparatus as claimed in claim 1 including a longitudinal bar extending across the containment portion of the cage and anchored at opposite ends to said centring guides in order to hold waste containers within said containment cage.

5. A waste disposal apparatus as claimed in claim 1 in which there are two spaced centring guides mounted to each upwardly extending member.

6. A waste disposal apparatus as claimed in claim 1 in which said support feet comprise inverted U-shaped members attached to the lower surface of the base platform and positioned and dimensioned to straddle and engage the upper perimeter member of the previous containment cage.

7. A method for disposing of toxic waste material utilizing the waste disposal apparatus of claim 1 comprising the steps:
   drilling a shaft in the ground;
   sealing the walls of the shaft;
   lowering waste disposal apparatus containing toxic waste containers into the shaft to stack atop previously lowered waste disposal apparatus in column;
   pouring concrete into the shaft in order to seal the toxic waste container within the waste disposal apparatus, the construction of the waste disposal apparatus ensuring that the concrete is able to completely surround the toxic waste container; and
   sealing the top of the shaft with a plate sandwiched between two concrete plugs.

8. A method for disposing of waste material as claimed in claim 7 in which the walls of the shaft are sealed by lining the walls with steel pipe and concrete.

9. A method for disposing of waste material as claimed in claim 8 in which said sealing plate is a steel plate welded to the lining walls of the shaft.

10. A method for disposing of waste material as claimed in claim 7 in which said shaft is drilled into a formation of shale sandstone or clay.

11. A method for disposing of waste material as claimed in claim 7 in which a vibrator apparatus is used to compact concrete into the shaft.

* * * * *